(12) United States Patent
Atieh et al.

(10) Patent No.: US 6,462,863 B1
(45) Date of Patent: Oct. 8, 2002

(54) SYSTEM AND METHOD FOR RESOLVING POLARIZATION MODE DISPERSION IN OPTICAL FIBERS

(75) Inventors: Ahmad K. Atieh, Nepean; Yi Liang; Shane H. Woodside, both of Ottawa, all of (CA)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/901,617

(22) Filed: Jul. 11, 2001

(51) Int. Cl.[7] ............................. H01S 3/00; G01N 21/00
(52) U.S. Cl. .................. 359/337.5; 356/73.1; 250/551; 250/227.18; 250/227.23
(58) Field of Search .................... 356/73.1; 359/337.5; 250/551, 227.18, 227.23

(56) References Cited

U.S. PATENT DOCUMENTS

| | | | |
|---|---|---|---|
| 5,956,131 A | * | 9/1999 | Mamyshev et al. ......... 356/73.1 |
| 6,118,523 A | * | 9/2000 | Brener et al. ............... 356/73.1 |
| 6,342,945 B1 | * | 1/2002 | Allen et al. ................. 356/73.1 |

* cited by examiner

Primary Examiner—Mark Hellner
(74) Attorney, Agent, or Firm—Neil Teitelbaum (57) ABSTRACT

A system and method for resolving polarization mode dispersion (PMD) in a span of optical fiber is described. The method involves three main stages: (1) launch two co-polarized optical signals to generate respective four-wave mixing product fields at the Stokes wavelength $\lambda_S$ or the anti-Stokes wavelength $\lambda_A$ sequentially in each part of the fiber to calculate chromatic dispersion; (2) repeatedly launch two optical signals at various states of polarization (SOP) using methods of stage (1) to calculate overall dispersion (i.e., a combination of chromatic dispersion and PMD); and (3) resolve from the overall dispersion calculated at stage (2) the PMD based on the known chromatic dispersion calculated at stage (1). In an ideal case, the PMD can be calculated from two separate measurements at different co-polarized states of polarization, where group velocity is calculated from a measured dispersion map, as a function of wavelength, at the SOPs and the difference is calculated to resolve PMD.

16 Claims, 7 Drawing Sheets

SYSTEM AND METHOD FOR RESOLVING POLARIZATION MODE DISPERSION IN OPTICAL FIBERS

FIELD OF THE INVENTION

The present invention relates to the field of optical fiber communications and, more particularly, to systems and methods for measuring/resolving polarization mode dispersion (PMD) in optical fibers.

BACKGROUND OF THE INVENTION

Fiber dispersion (both chromatic dispersion and polarization mode dispersion) is an important measure in the design of optical fiber systems. In its most general terms, dispersion is defined as the separation of a beam into its various components.

In an optical fiber, dispersion occurs because the differing wavelengths propagate at differing speeds resulting in what is termed chromatic dispersion. PMD is more complex in that, in a real fiber, residual birefringence from the manufacturing process and that induced by bending and thermal effects create differing optical axis that generally correspond to the maximum and minimum of the refractive index profiles across the diameter of the fiber. Such axes are usually orthogonal due to the mechanical stress distribution and have different propagation constants. These axes can be thought of as corresponding to the linearly polarized (LP) polarization modes or principal states of polarization. Plane polarized light propagating along the fiber will be resolved into components in these axes and as they propagate at different speeds, phase differences are created resulting in elliptically polarized light. The sum of all phase change mechanisms along a fiber is the measure of polarization mode dispersion.

U.S. Pat. No. 5,956,131 titled System and Method for Mapping Chromatic Dispersion in Optical Fibers issued Sep. 21, 1999 to Mamyshev et al. is directed to measuring chromatic dispersion only. Manyshev et al. proposed launching first and second optical pulses repetitively into a fiber under test to generate, by a four-wave mixing (FWM) process in the fiber, a probe signal. Because of the wave-vector phase mismatch, the probe signal power oscillates with a spatial frequency that can be measured as a function of distance in the fiber. These intensity oscillations are measurable as, for example, temporal variations in the Rayleigh backscattered light detected at the input end of the fiber. The dispersion parameter at one or both of the first and second optical signal wavelengths, as a function of length along the fiber, is derived directed from these intensity oscillations measurements.

In summary, Manyshev et al. calculates chromatic dispersion from a detected back-reflected Rayleigh signal at either the Stokes or anti-Stokes frequency, which has the wave-vector phase mismatch information. The wave-vector phase mismatch results from the fiber dispersion at one of the two source wavelengths. The wave-vector phase mismatch equals zero when the dispersion is zero. The polarization of the two laser sources launched into the fiber under test has to be aligned (i.e. co-polarized) to maximize the four-wave mixing products.

SUMMARY OF THE INVENTION

In accordance with one aspect of the present invention there is provided a method of resolving polarization mode dispersion in a span of optical fiber, comprising the steps of: (a) launching into a first end of the fiber, simultaneously, a first optical signal at a first wavelength and a second optical signal at a second wavelength such that the first and second wavelength are co-polarized at a first state of polarization to generate a first probe signal using a four wave mixing process in which two photons at the first wavelength combine with one photon at the second wavelength; (b) measuring the frequency of oscillations of the first probe signal as a function of distance in the fiber to generated a first measured dispersion map; (c) launching into the first end of the fiber, simultaneously, the first optical signal at the first wavelength and the second optical signal at the second wavelength such that the first and second wavelength are co-polarized at a second state of polarization to generate a second probe signal using a four wave mixing process in which two photons at the first wavelength combine with one photon at the second wavelength; (d) measuring the frequency of oscillations of the second probe signal as a function of distance in the fiber to generate a second measured dispersion map; and (e) deriving from the first and second measuring dispersion maps group velocities as a function of wavelength; and (f) calculating the difference between the group velocities of step (e) to obtain the polarization mode dispersion in the span of optical fiber.

In accordance with another aspect of the present invention there is provided a method of resolving polarization mode dispersion in a span of optical fiber, comprising the steps of: (a) launching into a first end of the fiber, simultaneously, a first optical signal at a first wavelength and a second optical signal at a second wavelength such that the first and second wavelength are co-polarized to generate a first probe signal using a four wave mixing process in which two photons at the first wavelength combine with one photon at the second wavelength; (b) measuring the frequency of oscillations of the first probe signal as a function of distance in the fiber; (c) deriving, for at least one of the first and second wavelengths, a chromatic dispersion parameter as a function of distance along the fiber from the measurement obtained from step (b); (d) launching into the first end of the fiber, simultaneously, the first optical signal at the first wavelength and the second optical signal at the second wavelength such that the first and second wavelength are at different states of polarization to generate a second probe signal using a four wave mixing process in which two photons at the first wavelength combine with one photon at the second wavelength; (e) measuring the frequency of oscillations of the second probe signal as a function of distance in the fiber; (f) repeating steps (d) and (e) at a plurality of different state of polarizations; (g) deriving, for at least one of the first and second wavelengths, a dispersion parameter representing a combination of the chromatic dispersion parameter and polarization mode dispersion as a function of distance along the fiber from the measurements obtained from steps (e) and (f); and (h) deriving from the dispersion parameter obtained at step (g) and from the chromatic dispersion parameter obtained at step (c) the polarization mode dispersion in the span of optical fiber.

In accordance with another aspect of the present invention there is provided an apparatus for resolving polarization mode dispersion in a span of optical fiber, comprising: (a) an optical signal generating arrangement for launching into a first end of the fiber, simultaneously, a first optical signal at a first wavelength and a second optical signal at a second wavelength at a first and a second co-polarized state of polarization to generate probe signals via a four wave mixing process where for each probe signal two photons at the first wavelength combine with one photon at the second wavelength; (b) a detecting arrangement for measuring the frequency of oscillations of the probe signals as a function of distance in the fiber, where for at least one of the first and second wavelengths at each of the first and second co-polarized states of polarization, dispersion maps are derived as a function of distance along the fiber; and (c) a calculating arrangement for deriving from the dispersion maps group velocities as a function of wavelength with polarization mode dispersion being the difference between the group velocities.

In accordance with another aspect of the present invention there is provided an apparatus for resolving polarization mode dispersion in a span of optical fiber, comprising: (a) an optical signal generating arrangement for launching into a first end of the fiber, simultaneously, a first optical signal at a first wavelength and a second optical signal at a second wavelength at (i) a co-polarized state of polarization and at (ii) a plurality of different states of polarization to generate probe signals via a four wave mixing process where for each probe signal two photons at the first wavelength combine with one photon at the second wavelength; and (b) a detecting arrangement for measuring the frequency of oscillations of the probe signals as a function of distance in the fiber, where for at least one of the first and second wavelengths, (i) a chromatic dispersion parameter is derived as a function of distance along the fiber from (a)(i) and (ii) a dispersion parameter is derived as a function of distance along the fiber from (a)(ii) such that polarization mode dispersion being the difference between the dispersion parameter and the chromatic dispersion parameter.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Further features and advantages of the present invention will be described in the detailed description, taken in combination with the appended drawings, in which.

DETAILED DESCRIPTION OF EMBODIMENTS OF THE PRESENT INVENTION

By way of general background, pulses at wavelengths $\lambda_1$ and $\lambda_2$ of various states of polarization (SOP) are simultaneously launched into a length of fiber under test. This will generate respective FWM product fields at the Stokes wavelength $\lambda_S$ and the anti-Stokes wavelength $\lambda_A$, sequentially in each part of the fiber. By measuring the frequency of the intensity oscillations in the probe signals generated in this matter, a detailed dispersion map, $D(\lambda_i, z)$ can be obtained directly, where D is the dispersion parameter, $\lambda_i$ is the wavelength of one of the two wavelengths used and z is the distance to a particular point along the fiber. The basic principles involved in obtaining a detailed dispersion map will be discussed prior to a description of an illustrative embodiment of the present invention for specifically resolving PMD.

The mode propagation constant κ can be expanded about the center angular frequency $\omega_0$ using a Taylor series given by equation (1).

$$k(\omega) = k_0 + \left.\frac{\delta k}{\delta \omega}\right|_{\omega=\omega_0} (\omega - \omega_0) + 1/2\delta^2 \left.\frac{k}{\delta \omega^2}\right|_{\omega=\omega_0} (\omega - \omega_0)^2 + \ldots \quad (1)$$

where $k_0$ and all derivatives are evaluated at frequency $\omega_0$. The first derivative of the propagation constant with respect to ω is the inverse group velocity, and its second derivative is the corresponding chromatic dispersion. The dispersion parameter, D, is the wavelength derivative of the inverse group velocity defined by equation (2).

$$D(\lambda) \equiv \frac{\delta}{\delta \lambda} \delta \frac{k}{\delta \omega} = -\frac{2\pi c}{\gamma^2} \frac{\delta^2 k}{\delta \omega^2} (\omega \to \lambda) \quad (2)$$

Figure 1:
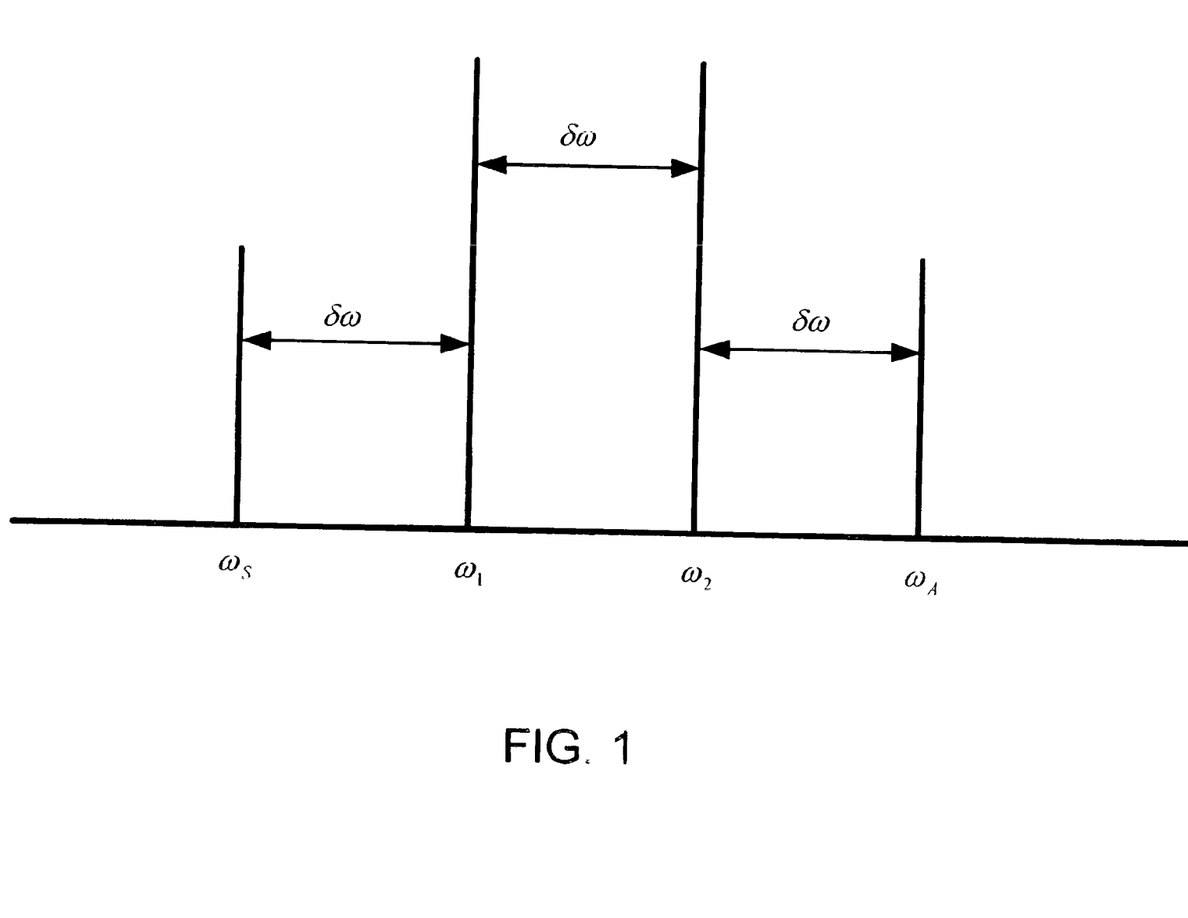
FIG. 1 is a graph showing the spectrum of the four-wave mixing process employed by the present invention.

The dispersion parameter $D(\lambda_i)$ is directly proportional to the wave-vector mismatch for one of two four-wave mixing processes shown in FIG. 1. In a first of these processes, two photons at angular frequency $\omega_1$ combine with one at angular frequency $\omega_2$ to form a Stokes photon at $\omega_S$. Symmetrically, in a second mixing process two photons at angular frequency $\omega_2$ combine with one at angular frequency $\omega_1$ to form an anti-Stokes photon at $\omega_A$. All spectral terms in FIG. 1 are separated uniformly by an amount δω.

The wave-vector mismatch (δk) for the first and second mixing process, discussed above, is in direction proportion to dispersion parameters $D(\lambda_1)$ and $D(\lambda_2)$, respectively. In the case of the first mixing process, for example, the wave-vector mismatch can be related to the dispersion parameter $D(\lambda_1)$ as shown in equation (3).

$$\delta k(\lambda_1) = k_2 + k_S - 2k_1 = \left.\frac{\delta^2 k}{\delta \omega^2}\right|_{\omega=\omega_0} \Delta\omega^2 = -2\pi c D(\lambda_1)\left(\frac{\delta \lambda}{\lambda}\right)^2 \quad (3)$$

According to an embodiment of the present invention, a technique for resolving PMD involves three main stages:
(a) launch two co-polarized optical signals to generate respective FWM product fields at the Stokes wavelength $\lambda_S$ and/or the anti-Stokes wavelength $\lambda_A$ sequentially in each part of the fiber to calculate chromatic dispersion (as discussed above and in more detail below);
(b) repeatedly launch two optical signals at various states of polarization using methods of stage (a) to calculate overall dispersion (i.e., a combination of chromatic dispersion and PMD); and
(c) resolve from the overall dispersion calculated at stage (b) the PMD based on the known chromatic dispersion calculated at stage (a).

In relation to the processing involved in stages (a) and (b), due to the phase mismatch ($\delta_k$), the corresponding power of the Stokes signal $P_S(z)$ oscillates with spatial frequency as defined in equation (4).

$$F_S = 1/\Lambda_S = \frac{\delta k}{2\pi} = cD(\lambda_1)\left(\frac{\Delta\lambda}{\lambda}\right)^2 \quad (4)$$

By measuring the frequency $F_S(z)$ of the intensity oscillations in the power of the Stokes signal, it is possible to obtain a dispersion map $D(\lambda_1,z)$ having a spatial resolution $\Lambda_S$. Similarly, it is also possible to obtain a dispersion map $D(\lambda_2,z)$ by measuring the frequency $F_A(z)$ of intensity oscillations in the power of the anti-Stokes signal. From knowledge of the slope of the fiber dispersion, which is determined by comparing measurements of dispersion maps $D(\lambda_1,z)$ and $D(\lambda_2,z)$, either of the measured dispersion maps can be easily converted to that for any other desired wavelengths.

A variety of known techniques can be used to measure intensity oscillations. For example, intensity oscillations may be observed in Rayleigh backscattering at an input end of the fiber under test. There, the signal will fluctuate at a temporal frequency defined by equation (5).

$$f_{sig}(t) = \frac{c}{2n} F_S(z) \quad (5)$$

where n is the effective index of refraction of the fiber, and where t is the round-trip time from the fiber input to point z and return as defined in equation (6).

$$t = \frac{2nz}{c} \quad (6)$$

By combining equations (4) and (5), the dispersion map is obtained for the first input signal at wavelength $\lambda_1$ as defined by equation (7).

$$D(\lambda_1, z) = \frac{2n}{c^2}\left(\frac{\lambda_1}{\Delta\lambda}\right)^2 f_{sig}\left(t = \frac{2n}{c} z\right) \quad (7)$$

From the known loss and scattering properties of the fiber, and the four-wave mixing process, the strength of the Rayleigh backscattered signal can be estimated. For the case where the input pulses at $\lambda_1$ and $\lambda_2$ are co-polarized (i.e., stage (a) processing) and where there is no significant initial signal at $\lambda_S$ and $\lambda_A$, the signal power at the Stokes wavelength $\lambda_S$ is defined by equation (8).

$$P_S(z) = 8\left(\frac{\lambda}{Dc\delta\lambda^2}\right)^2\left(\frac{n_2 P_1^0}{A_{\it eff}}\right) P_2^0 \sin^2(\delta k z/2) \times R\delta z \times \exp(-4\alpha z) \quad (8)$$

where $P_1^0$ and $P_2^0$ are the pulse peak powers at the fiber input, $A_{\it eff}$ is the effective area of the fiber core, $n_2$ is the fiber non-linear index coefficient, R is the Rayleigh backscattering coefficient, $\delta z$ is the fiber length occupied by the pulses at any given time, and $\alpha$ is the fiber's loss coefficient. A similar expression yields the signal power $P_A(z)$ at the anti-Stokes wavelength $\lambda_A$.

There is a non-linear contribution to the wave-vector mismatch $\delta k$, which for the first (Stokes) mixing process is defined by equation (9).

$$\delta k_{nl} = \gamma(2P_1 - P_2) \quad (9)$$

A similar expression (i.e., reverse the subscripts 1 and 2 in equation 9) applies for the second (anti-Stokes) mixing process. Equation 10 defines the fiber non-linear parameter $\gamma$.

$$\gamma = \frac{2\pi}{\lambda} \frac{n_2}{A_{\it eff}} \quad (10)$$

As discussed briefly above, optical fibers are not single mode due to model birefringence. Therefore, when two continuous wave (CW) signals, which have a specified state of polarization, are launched into the fiber, their energy is divided into two-polarization axes (slow and fast). Light travels with different speed on each axis due to the difference in refractive index on each axis. The resultant FWM products generated at the fiber end are a superposition of two separate FWM components, each of which is a result of nonlinear interaction at that polarization axis.

If the state of polarization of the two CW signals is adjusted to align with one of the polarization axes at each time, then the measured dispersion is only chromatic dispersion. In contrast, and according to the present invention, if the state of polarization of the two signals $\lambda_1$ and $\lambda_2$ are misaligned with these axes, then the PMD of the fiber will be incorporated in the measurement. As a result, according to the present invention discussed in more detail below, the PMD can be resolved from the dispersion measurements given the chromatic dispersion measurements.

Figure 2:
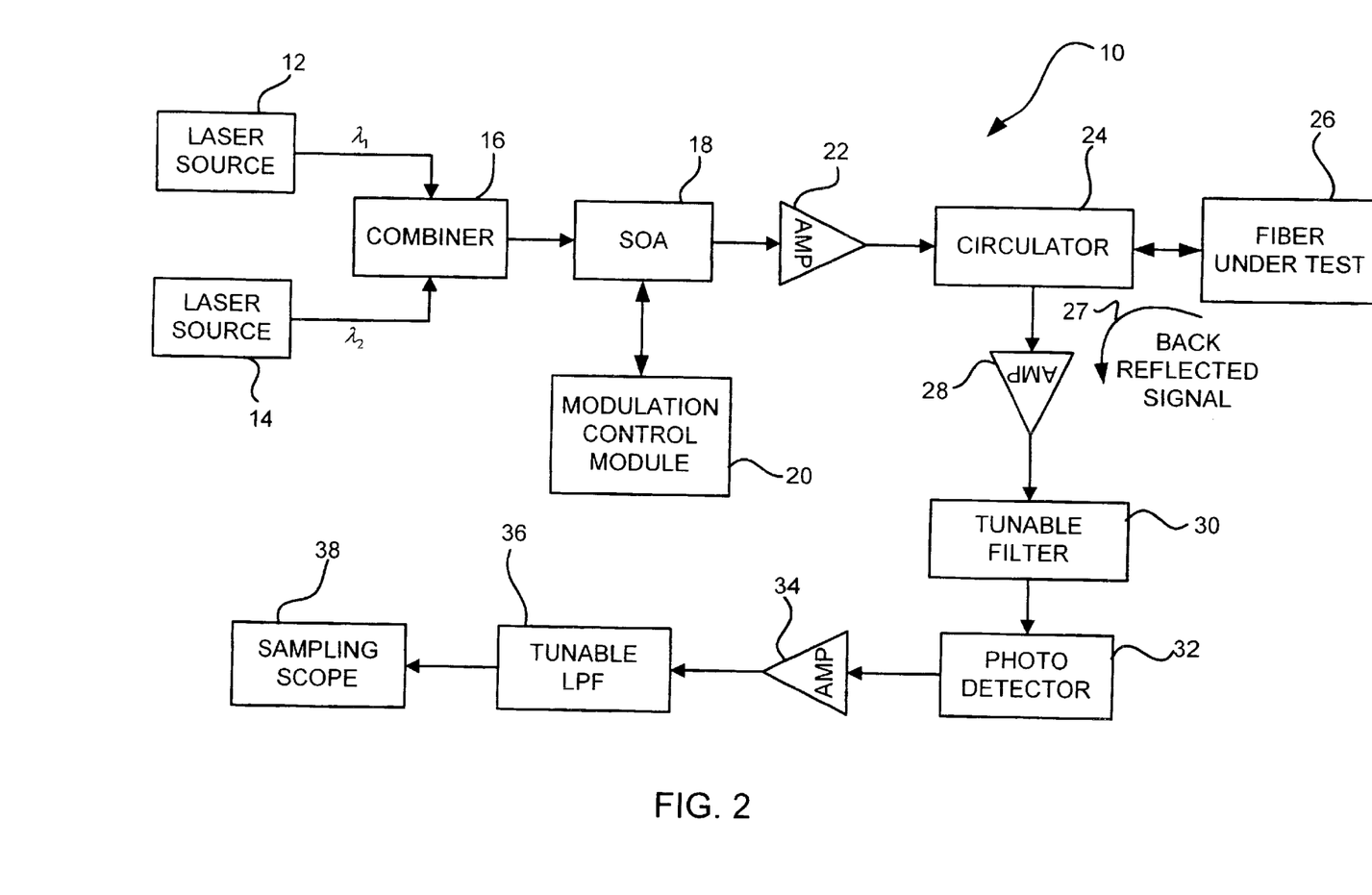
FIG. 2 is a block diagram showing a dispersion measuring system according to an embodiment of the present invention.

With reference to FIG. 2, a dispersion measuring system 10 according to an embodiment of the present invention is shown. Input signals $\lambda_1$ and $\lambda_2$ are generated by CW sources 12 and 14 (e.g., any suitable optical signal generation device such as diode lasers, optical pulse generators etc.), respectively. More specifically, a continuous wave (CW) laser source is one that emits a continuous beam of coherent light. The excitation mechanism of such lasers supply continuous power to the active medium to sustain lasing at a constant rate as is well known in the art.

The signals $\lambda_1$ and $\lambda_2$ generated by the sources 12 and 14 are combined using a combiner 16 (e.g., fiber coupler). The output of the combiner 16 is amplified by a semi-conductor optical amplifier (SOA) 18, which is controlled by a modulation control module 20. The module 20 includes well-known components (not shown) such as function generators, temperature controllers, and driver circuits.

The output of the SOA 18 is supplied to an optical amplifier 22 (e.g., an erbium doped fiber amplifier-EDFA) to sufficient gain to bring the signals up to peak power levels. A three-port circulator 24 launches the pulses into a fiber under test 26 and directs a Rayleigh backscattered signal 27 to another optical amplifier 28 to provide sufficient gain to allow subsequent processing of the backscattered signals.

Tuning to the desired backscattered signal, which will be at either the Stokes or anti-Stokes wavelength as discussed above, is achieved by a tunable narrow band optical filter 30, which passes the signal of interest to a photodetector 32 for detection. The output of the photodetector 32 is amplified by an amplifier 34 passed to a tunable low pass filter (LPF) 36 and supplied to a sampling scope 38 for ultimate analysis.

Figures 3A, 3B:
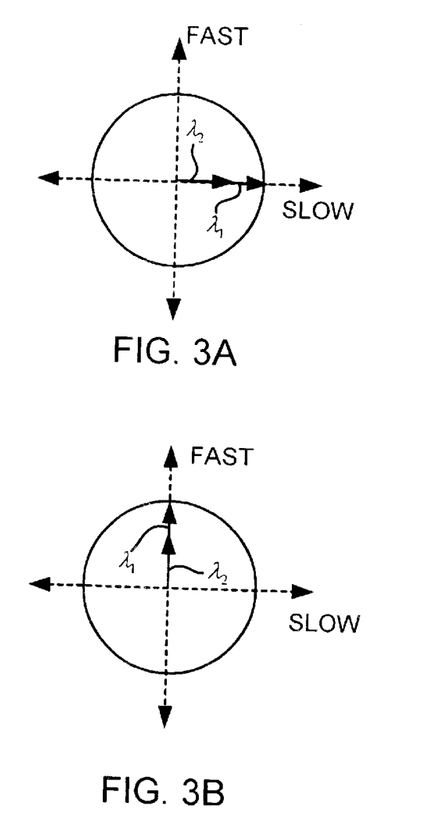
FIGS. 3A, 3B, 3C and 3D are graphs showing various states of polarization of input wavelengths into the system of FIG. 2.

FIGS. 3A and 3B show the input wavelengths $\lambda_1$ and $\lambda_2$ at co-polarized SOPs (slow in FIG. 3A and fast in FIG. 3B) used to obtain chromatic dispersion measurements as discussed above. In an ideal case, the PMD can be calculated from two separate measurements at each SOP, where group velocity $\tau$ is first calculated from the measured dispersion map (as a function of wavelength) at one SOP according to equation (11) then calculating the difference.

$$\tau(\lambda) = L \int_{\lambda_1}^{\lambda_2} D(\lambda) d\lambda \quad (11)$$

where L is the fiber length.

Figure 3C:
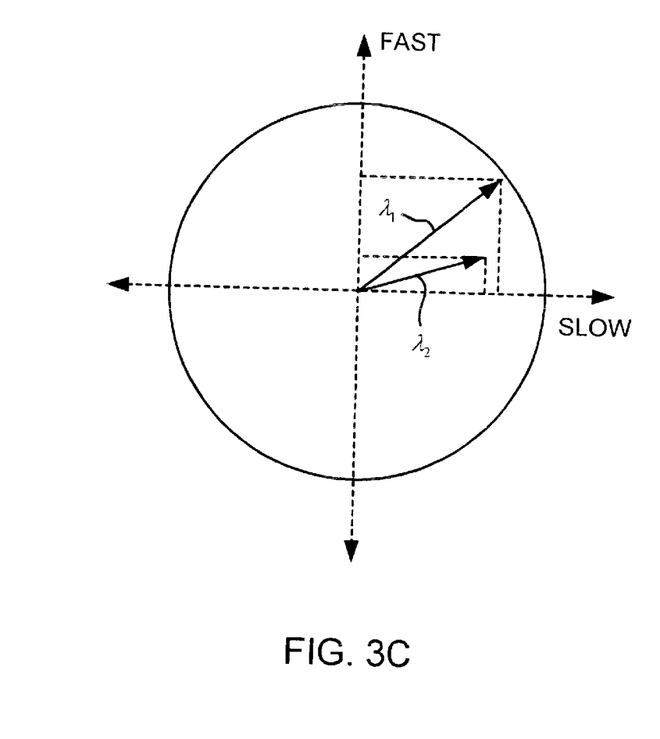
Figure 3D:
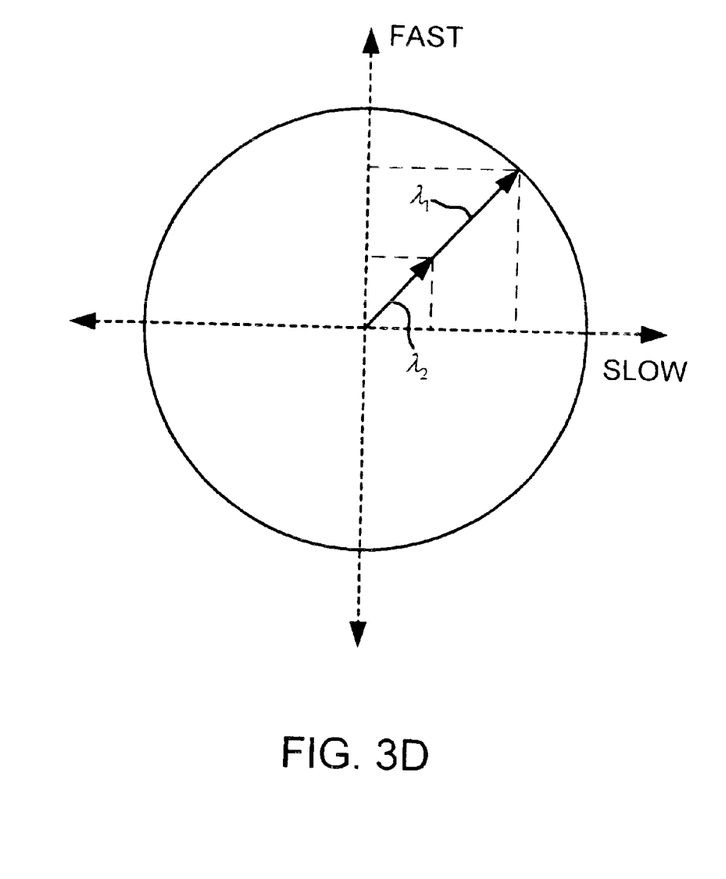

FIG. 3C shows the input wavelengths $\lambda_1$ and $\lambda_2$ (non-co-polarized) at polarization settings that are off the principle SOPs (FIG. 3C shows the wavelengths resolved to the fast and slow axes by the dotted lines) used to obtain overall dispersion as discussed above. FIG. 3D shows the input wavelengths $\lambda_1$ and $\lambda_2$ (co-polarized) at a polarization setting that is off the principle SOPs (FIG. 3D shows the wavelengths resolved to the fast and slow axes by the dotted lines) used to obtain overall dispersion as discussed above.

There are different algorithms known in the art that can be used to calculate the PMD from the measured spatial group delay. For example, these techniques include all-polarization states scanning and four predetermined polarization states method as disclosed in P. A. Williams, "Modulation phase-shift measurement of PMD using only four launched polarization states: a new algorithm", Electron. Lett., Vol. 35, No. 18, 1999, the P. A. Williams reference being incorporated therein by reference.

Figure 4:
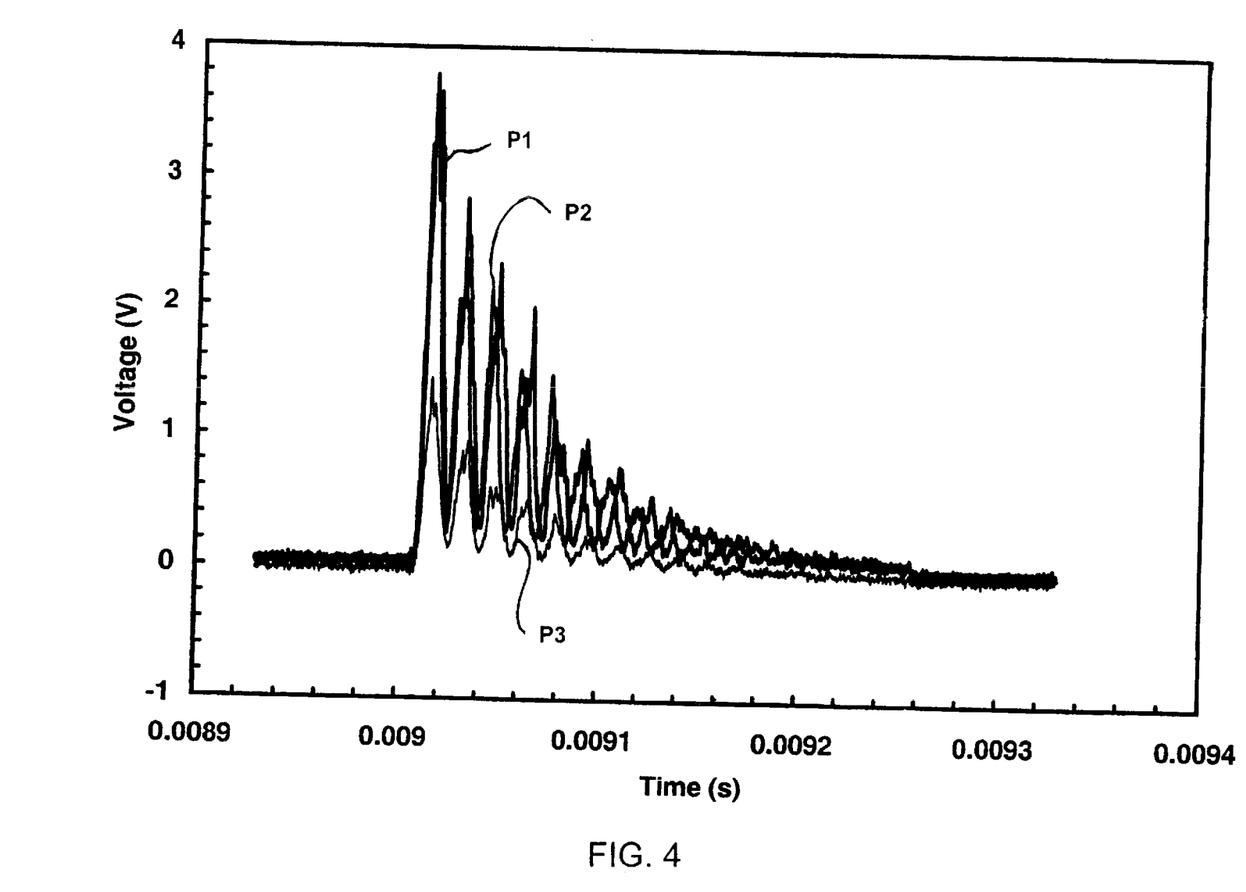
FIG. 4 is a graph showing raw measured data traces of voltage versus time for different polarization settings of the input wavelengths according to an example of the present invention.

FIG. 4 shows samples of the signal returned from a 25 km long span of the fiber under test 26 and plotted as voltage versus time. Plot P1 is for wavelengths $\lambda_1$ and $\lambda_2$ at a state of polarization SOP 1. Plot P2 is for wavelengths $\lambda_1$ and $\lambda_2$ at a state of polarization SOP 2. Plot P3 is for wavelengths $\lambda_1$ and $\lambda_2$ at a state of polarization SOP 3.

Figure 5:
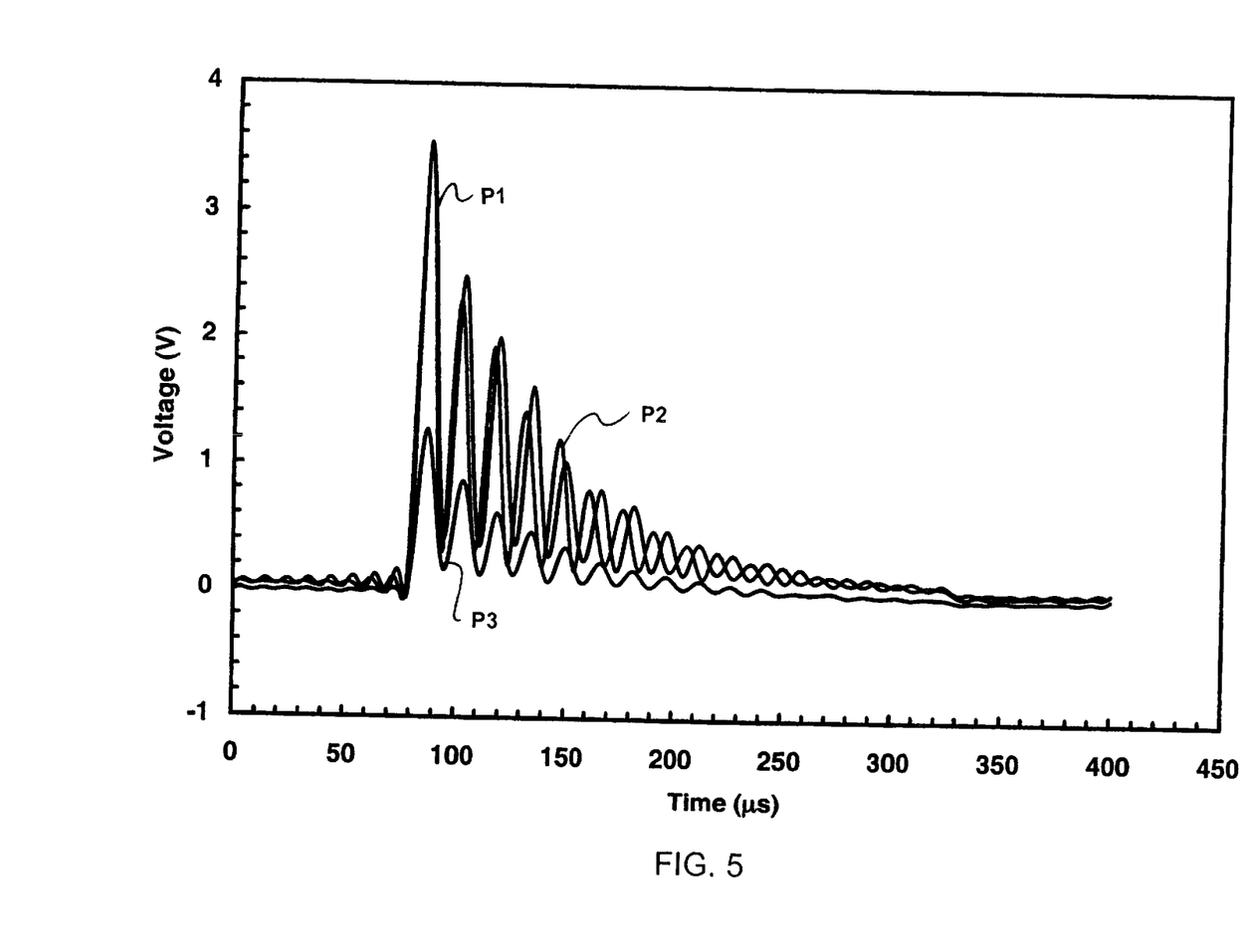
FIG. 5 is a graph showing smoothed measured wave-vector phase mismatch traces for the different polarization settings of the input wavelength traces of FIG. 4.
Figure 6:
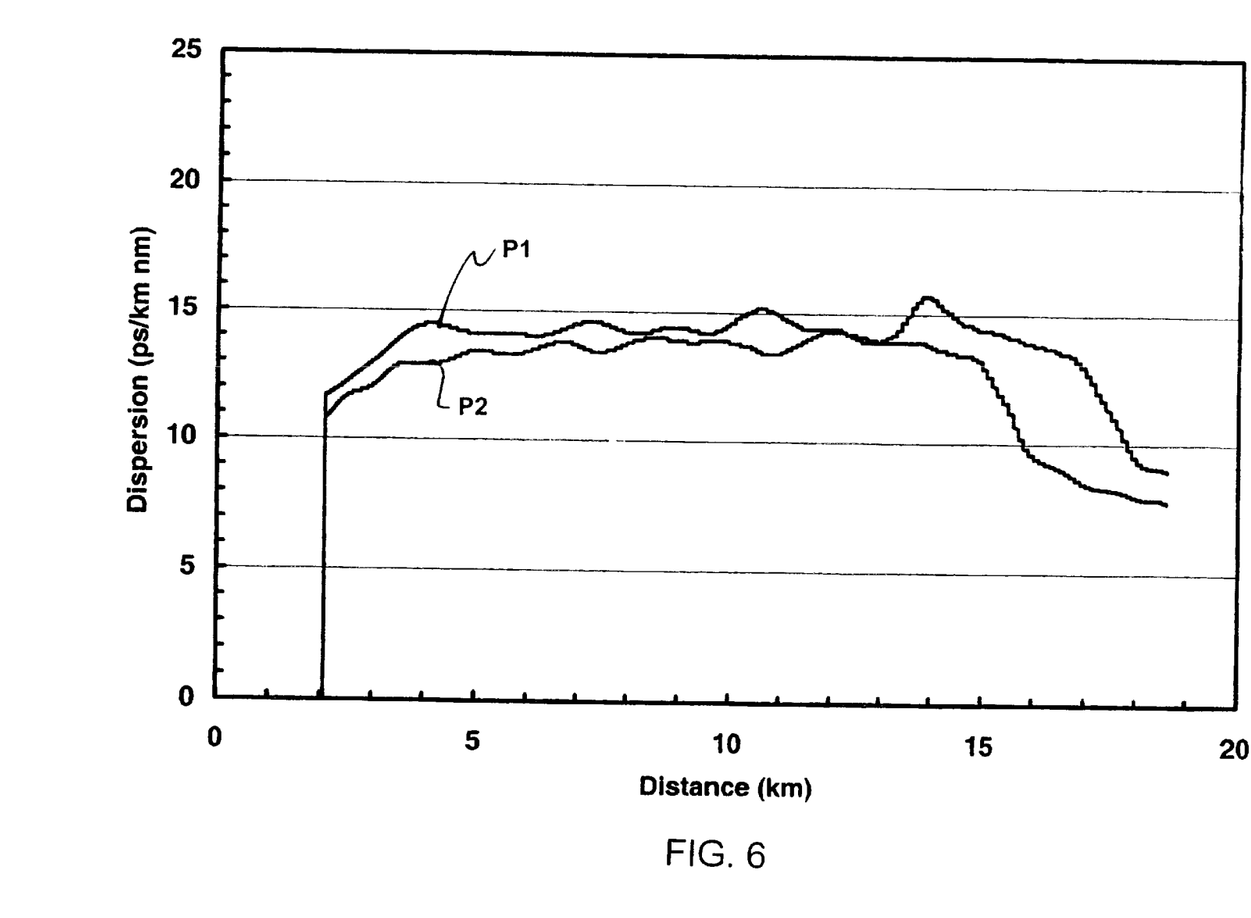
FIG. 6 is a graph showing calculated dispersion (chromatic dispersion and PMD) traces for a subset of the traces of FIG. 5.

FIG. 5 shows smoothed wave-vector phase mismatch traces for plots P1–P2 of FIG. 4. FIG. 6 shows the calculated overall dispersion (i.e. chromatic dispersion and PMD) traces for plots P1 and P2 of FIGS. 4 and 5.

In summary, according to one exemplary embodiment (i.e., using two co-polarized SOPs, see FIGS. 3A–B) of the present invention a method of resolving polarization mode dispersion in a span of optical fiber includes the following steps:

(a) launching into a first end of the fiber, simultaneously, a first optical signal at a first wavelength and a second optical signal at a second wavelength such that the first and second wavelength are co-polarized at a first state of polarization to generate a first probe signal using a four wave mixing process in which two photons at the first wavelength combine with one photon at the second wavelength;

(b) measuring the frequency of oscillations of the first probe signal as a function of distance in the fiber to generated a first measured dispersion map;

(c) launching into the first end of the fiber, simultaneously, the first optical signal at the first wavelength and the second optical signal at the second wavelength such that the first and second wavelength are co-polarized at a second state of polarization to generate a second probe signal using a four wave mixing process in which two photons at the first wavelength combine with one photon at the second wavelength;

(d) measuring the frequency of oscillations of the second probe signal as a function of distance in the fiber to generate a second measured dispersion map; and (e) deriving from the first and second measuring dispersion maps group velocities as a function of wavelength, using equation (11); and (f) calculating the difference between the group velocities of step (e) to obtain the polarization mode dispersion in the span of optical fiber.

In summary, according to another exemplary embodiment (i.e., using co-polarized (see FIG. 3D) and non-co-polarized (FIG. 3C) SOPs) of the present invention a method of resolving polarization mode dispersion in a span of optical fiber includes the following steps:

(a) launching (preferably repetitively launching pulses) into a first end of the fiber, simultaneously, a first optical signal at a first wavelength and a second optical signal at a second wavelength (preferably the second wavelength is shorter than the first wavelength and the ratio of launched power between the first and second wavelengths is approximately 1:2) such that the first and second wavelength are co-polarized to generate a first probe signal (Stokes or anti-Stokes signal) using a four wave mixing process in which two photons at the first wavelength combine with one photon at the second wavelength;

(b) measuring the frequency of oscillations of the first probe signal as a function of distance in the fiber (preferably performed by observing a Rayleigh-backscattered sample of the first and second probe signals at the first end of the fiber);

(c) deriving, for at least one of the first and second wavelengths, a chromatic dispersion parameter as a function of distance along the fiber from the measurement obtained from step (b);

(d) launching (preferably repetitively launching pulses) into the first end of the fiber, simultaneously, the first optical signal at the first wavelength and the second optical signal at the second wavelength such that the first and second wavelength are at different states of polarization to generate a second probe signal (Stokes or anti-Stokes signal) using a four wave mixing process in which two photons at the first wavelength combine with one photon at the second wavelength;

(e) measuring the frequency of oscillations of the second probe signal as a function of distance in the fiber (preferably performed by observing a Rayleigh-backscattered sample of the first and second probe signals at the first end of the fiber);

(f) repeating steps (d) and (e) at a plurality of different state of polarizations;

(g) deriving, for at least one of the first and second wavelengths, a dispersion parameter representing a combination of the chromatic dispersion parameter and polarization mode dispersion as a function of distance along the fiber from the measurements obtained from steps (e) and (f); and (h) deriving from the dispersion parameter obtained at step (g) and from the chromatic dispersion parameter obtained at step (c) the polarization mode dispersion in the span of optical fiber.

In summary, according to another exemplary embodiment (i.e., using two co-polarized SOPs, see FIGS. 3A–B) of the present invention an apparatus for resolving polarization mode dispersion in a span of optical fiber includes the following components:

(a) an optical signal generating arrangement for launching into a first end of the fiber, simultaneously, a first optical signal at a first wavelength and a second optical signal at a second wavelength at a first and a second co-polarized state of polarization to generate probe signals via a four wave mixing process where for each probe signal two photons at the first wavelength combine with one photon at the second wavelength;

(b) a detecting arrangement for measuring the frequency of oscillations of the probe signals as a function of distance in the fiber, where for at least one of the first and second wavelengths at each of the first and second co-polarized states of polarization, dispersion maps are derived as a function of distance along the fiber; and (c) a calculating (using equation 11) arrangement for deriving from the dispersion maps group velocities as a function of wavelength with polarization mode dispersion being the difference between the group velocities.

In summary, according to another exemplary embodiment (i.e., using co-polarized and non-co-polarized SOPs, see FIGS. 3C–D) of the present invention an apparatus for resolving polarization mode dispersion in a span of optical fiber includes the following components:

(a) an optical signal generating arrangement for launching into a first end of the fiber, simultaneously, a first optical signal at a first wavelength and a second optical signal at a second wavelength at (i) a co-polarized state of polarization and at (ii) a plurality of different states of polarization to generate probe signals via a four wave mixing process where for each probe signal two photons at the first wavelength combine with one photon at the second wavelength; and (b) a detecting arrangement (preferably operable to receive a Rayleigh-backscattered sample of probe signals) at the first end of the fiber. for measuring the frequency of oscillations of the probe signals as a function of distance in the fiber, where for at least one of the first and second wavelengths, (i) a chromatic dispersion parameter is derived as a function of distance along the fiber from (a)(i) and (ii) a dispersion parameter is derived as a function of distance along the fiber from (a)(ii) such that polarization mode dispersion being the difference between the dispersion parameter and the chromatic dispersion parameter.

While the invention has been described and illustrated in connection with preferred embodiments it is to be understood that the subject matter herein is not to be limited to those specific embodiments. On the contrary, it is intended for the subject matter of the invention to include all alternatives, modifications and equivalents as can be included within the spirit and full scope of the following claims.

What is claimed is:

1. A method of resolving polarization mode dispersion in a span of optical fiber, comprising the steps of:

(a) launching into a first end of the fiber, simultaneously, a first optical signal at a first wavelength and a second optical signal at a second wavelength such that the first and second wavelength are co-polarized at a first state of polarization to generate a first probe signal using a four wave mixing process in which two photons at the first wavelength combine with one photon at the second wavelength;

(b) measuring the frequency of oscillations of the first probe signal as a function of distance in the fiber to generated a first measured dispersion map;

(c) launching into the first end of the fiber, simultaneously, the first optical signal at the first wavelength and the second optical signal at the second wavelength such that the first and second wavelength are co-polarized at a second state of polarization to generate a second probe signal using a four wave mixing process in which two photons at the first wavelength combine with one photon at the second wavelength;

(d) measuring the frequency of oscillations of the second probe signal as a function of distance in the fiber to generate a second measured dispersion map; and (e) deriving from the first and second measuring dispersion maps group velocities as a function of wavelength; and (f) calculating the difference between the group velocities of step (e) to obtain the polarization mode dispersion in the span of optical fiber.

2. The method of claim 1, wherein the group velocities are calculating as follows:

$$\tau(\lambda) = L \int_{\lambda_1}^{\lambda_2} D(\lambda) d\lambda$$

where $\tau$ is the group velocity, L is fiber length, $\lambda$ is wavelength, $\lambda_1$ is the first wavelength and $\lambda_2$ is the second wavelength.

3. A method of resolving polarization mode dispersion in a span of optical fiber, comprising the steps of:

(a) launching into a first end of the fiber, simultaneously, a first optical signal at a first wavelength and a second optical signal at a second wavelength such that the first and second wavelength are co-polarized to generate a first probe signal using a four wave mixing process in which two photons at the first wavelength combine with one photon at the second wavelength;

(b) measuring the frequency of oscillations of the first probe signal as a function of distance in the fiber;

(c) deriving, for at least one of the first and second wavelengths, a chromatic dispersion parameter as a function of distance along the fiber from the measurement obtained from step (b);

(d) launching into the first end of the fiber, simultaneously, the first optical signal at the first wavelength and the second optical signal at the second wavelength such that the first and second wavelength are at different states of polarization to generate a second probe signal using a four wave mixing process in which two photons at the first wavelength combine with one photon at the second wavelength;

(e) measuring the frequency of oscillations of the second probe signal as a function of distance in the fiber;

(f) repeating steps (d) and (e) at a plurality of different state of polarizations;

(g) deriving, for at least one of the first and second wavelengths, a dispersion parameter representing a combination of the chromatic dispersion parameter and polarization mode dispersion as a function of distance along the fiber from the measurements obtained from steps (e) and (f); and (h) deriving from the dispersion parameter obtained at step (g) and from the chromatic dispersion parameter obtained at step (c) the polarization mode dispersion in the span of optical fiber.

4. The method of claim 3, wherein the first and the second probe signal is a Stokes signal.

5. The method of claim 3, wherein the second wavelength is shorter than the first wavelength and the ratio of launched power between the first and second wavelengths is approximately 1:2.

6. The method of claim 3, wherein the first and the second probe signal is an anti-Stokes signal.

7. The method of claim 3, wherein the measuring steps (b) and (e) are performed by observing a Rayleigh-backscattered sample of the first and second probe signals at the first end of the fiber.

8. The method of claim 3, wherein the launching steps (a) and (d) comprises repetitively launching pulses at the first and second wavelengths.

9. An apparatus for resolving polarization mode dispersion in a span of optical fiber, comprising:
   (a) an optical signal generating arrangement for launching into a first end of the fiber, simultaneously, a first optical signal at a first wavelength and a second optical signal at a second wavelength at a first and a second co-polarized state of polarization to generate probe signals via a four wave mixing process where for each probe signal two photons at the first wavelength combine with one photon at the second wavelength;
   (b) a detecting arrangement for measuring the frequency of oscillations of the probe signals as a function of distance in the fiber, where for at least one of the first and second wavelengths at each of the first and second co-polarized states of polarization, dispersion maps are derived as a function of distance along the fiber; and
   (c) a calculating arrangement for deriving from the dispersion maps group velocities as a function of wavelength with polarization mode dispersion being the difference between the group velocities.

10. The apparatus of claim 9, wherein the group velocities are calculated as follows:

$$\tau(\lambda) = L \int_{\lambda_1}^{\lambda_2} D(\lambda) d\lambda$$

where $\tau$ is the group velocity, L is fiber length, $\lambda$ is wavelength, $\lambda_1$ is the first wavelength and $\lambda_2$ is the second wavelength.

11. An apparatus for resolving polarization mode dispersion in a span of optical fiber, comprising:
   (a) an optical signal generating arrangement for launching into a first end of the fiber, simultaneously, a first optical signal at a first wavelength and a second optical signal at a second wavelength at (i) a co-polarized state of polarization and at (ii) a plurality of different states of polarization to generate probe signals via a four wave mixing process where for each probe signal two photons at the first wavelength combine with one photon at the second wavelength; and
   (b) a detecting arrangement for measuring the frequency of oscillations of the probe signals as a function of distance in the fiber, where for at least one of the first and second wavelengths, (i) a chromatic dispersion parameter is derived as a function of distance along the fiber from (a)(i) and (ii) a dispersion parameter is derived as a function of distance along the fiber from (a)(ii) such that polarization mode dispersion being the difference between the dispersion parameter and the chromatic dispersion parameter.

12. The apparatus of claim 11, wherein the probe signals are Stokes signals.

13. The apparatus of claim 11, wherein the second wavelength is shorter than the first wavelength and the ratio of launched power between the first and second wavelengths is approximately 1:2.

14. The apparatus of claim 11, wherein each one of the probe signals is an anti-Stokes signal.

15. The apparatus of claim 11, wherein the detecting arrangement is operable to receive a Rayleigh-backscattered sample of the probe signals at the first end of the fiber.

16. The apparatus of claim 11, wherein the first and second optical signals are pulses.

* * * * *

UNITED STATES PATENT AND TRADEMARK OFFICE
CERTIFICATE OF CORRECTION

PATENT NO.     : 6,462,863 B1
DATED          : October 8, 2002
INVENTOR(S)    : Atieh et al.

It is certified that error appears in the above-identified patent and that said Letters Patent is hereby corrected as shown below:

Column 4,
Line 12, "$k$can" should read -- $k$ can --

Signed and Sealed this

Fourth Day of March, 2003

JAMES E. ROGAN
*Director of the United States Patent and Trademark Office*